July 6, 1948.
F. M. ALLEN ET AL
FLEXIBLE PIPE COUPLING WITH
FLUID-SUPPORTED PACKING
Filed Jan. 9, 1942
2,444,868
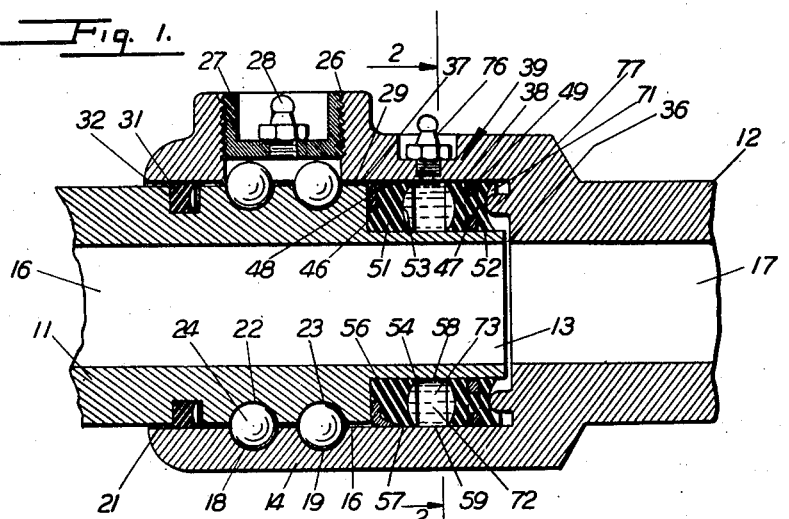
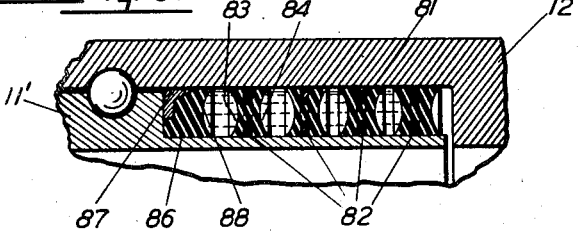
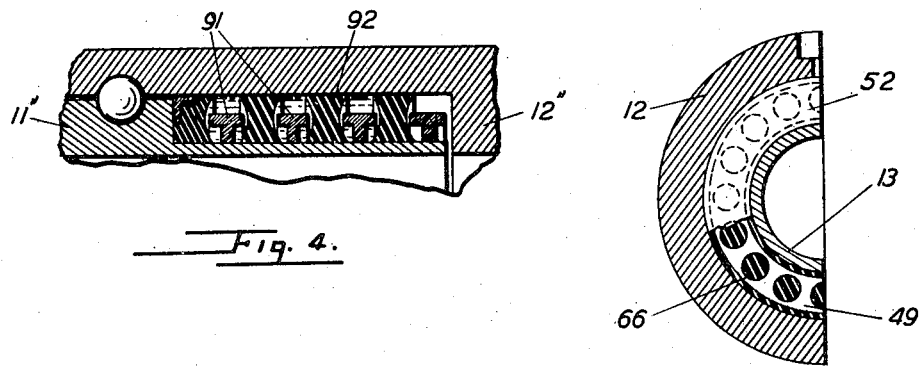
FRANK M. ALLEN
CLYDE B. TAYLOR
INVENTORS
BY
ATTORNEY.

Patented July 6, 1948

2,444,868

UNITED STATES PATENT OFFICE 2,444,868

FLEXIBLE PIPE COUPLING WITH FLUID-SUPPORTED PACKING

Frank M. Allen, Azusa, and Clyde B. Taylor, Long Beach, Calif., assignors to The All-Flex Corporation, Los Angeles, Calif., a corporation of California Application January 9, 1942, Serial No. 426,208

1 Claim. (Cl. 285—97.3)

This invention relates to pipe joints or couplings, and more particularly to pipe couplings of the type which interconnect two pipe elements for rotary movement with respect to each other and yet maintain a fluid-tight joint therebetween to prevent leakage. This is a type of pipe coupling known in the trade as a "swing joint."

An object of the present invention is the provision of a pipe joint of the general character indicated which operates with a maximum of efficiency in preventing leakage of the fluid conducted by the conduit of which the joint is a part and yet which offers a minimum of frictional resistance to relative movement of the two parts of the coupling.

A more detailed object in this connection is the provision of a pipe joint which employs a plurality of packing elements as the means for preventing leakage between the two portions of the joint and wherein all but one of the packings is supported by a fluid instead of abutting a rigid shoulder on one of the elements of the joint. This fluid serves the two fold function of enhancing the efficiency of the packing to prevent leakage and of reducing the amount of frictional resistance presented by the elements contacted by the packing.

A further object in this connection is the provision of a pipe joint of the character described, the packers of which are designed to prevent leakage of fluid therepast in either of two directions so as to cause them to operate to prevent leakage not only of the fluid confined by the conduit of which the pipe joint is a part, but they also serve to confine the fluid which is interposed between the packers and which serves to hold the packers separated from each other.

A further object is to provide means for injecting the packer-separating fluid into the recess between packers after the joint has been fully assembled with the packers in operative position thereinside.

The present application, therefore, constitutes a continuation in part of our copending application, Serial No. 317,740, filed Feb. 7, 1940, which matured to Patent No. 2,269,431 on January 13, 1942.

The invention possesses other objects and valuable features, some of which, with those enumerated, will be set forth in the following description of the preferred embodiments of our invention illustrated in the drawing accompanying and forming part of the specification. It is to be understood that we do not limit ourselves to the showing made by the said drawing and description as we may adopt variations of the preferred forms within the scope of our invention as defined by the claim.

Referring to the drawing:

Figure 1 is a longitudinal, medial, sectional view taken through a pipe joint embodying the principles of our present invention.

Fig. 2 is a view in transverse, vertical section, the plane of section being indicated by the line 2—2 of Fig. 1 and the direction of view by the arrows.

Fig. 3 is a view similar to Fig. 1, partly broken away to reduce its size, illustrating a slightly modified form of pipe joint embodying the principles of our present invention.

Fig. 4 is another view similar to Fig. 1, partly broken away to reduce its size, illustrating a still further modified form of joint embodying the principles of our present invention.

In terms of broad inclusion the flexible pipe joint of the present invention serves to interconnect two portions of a conduit such as a pipe line in such a manner as to maintain constant communication between the respective bores of those two portions for relatively rotary motion of one with respect to the other, and yet to prevent leakage of the fluid contained by the conduits. Accordingly, packers are employed to permit this relative rotary motion and prevent leakage of the joint; and the present invention contemplates the use of at least one of said packers which is supported within its recess by a fluid in contradistinction to more conventional constructions wherein it is customary to provide a rigid shoulder against which the packers abut to prevent its shifting laterally within the recess.

Referring first to that embodiment of our invention which is illustrated in Fig. 1, the joint comprises cooperating male and female pipe sections 11 and 12 respectively, the end 13 of the male section 11 being revolubly disposed within the belled end 14 of the female section 12, and the two sections being in coaxial relation and having their bores 16 and 17, respectively, in communication with each other. Preferably a pair of ball races 18 and 19 are formed in the bore 21 of the bell 14; and cooperating races 22 and 23, respectively, are provided in registry therewith in the outer circumferential wall of the end 13 of the male pipe section 11, to accommodate antifriction balls 24. Inasmuch as these balls 24 fit within the registering races or grooves 18, 19, 22, and 23 they serve not only to retain the two pipe sections 11 and 12 accurately in line and permit rotation therebetween with a minimum of friction, but they also operate to retain the sections against axial movement with respect to each other, i. e., they serve to hold the sections together against both radial and axial thrust. They are inserted into the races after the two pipe sections have been placed in proper relative position, through an opening 26 in one side of the bell 14; and after insertion of the balls 24 a plug 27 is threaded into the opening to prevent escape of the balls. The plug 27 is provided with a fitting 28, preferably of conventional design for use in applying lubricants under pressure not only to the ball races 18, 19, 22 and 23, but also to the interstice 29 between the two pipe sections 11 and 12. Escape of this lubricant from the interstice 29 and to the atmosphere is prevented through the expedient of an annular packing 31 of suitable design operatively seated within an annular recess 32 in the outer circumferential wall of the male pipe section 11 and in such position that it engages the inner circumferential wall of the belled end 14 of the female pipe section 12 between the ball races and the extreme end of the female pipe section.

The interstice 29 comprises a radial portion 36 and a circumferential portion 37; and we have found that a highly advantageous location for the recess 38 for the accommodation of the packing 39 is at the intersection of these two portions 36 and 37 of the interstice. The recess 38 preferably is formed by chambering the outer circumferential surface of the male pipe section 11 at the extreme inner end thereof, so that any fluid entering the recess from the bore of the conduit into which the joint is connected has to enter by way of the radial portion 36 of the interstice; and from the recess 38 the only means of egress is through the circumferential portion 37 of the interstice. It is for the purpose of preventing the escape of fluid under pressure through the interstice 29, i. e., between the sections 11 and 12 of the joint, that the packing 39 is provided.

The packing 39 comprises, in the modification presently being described, two separately mounted and independently operating packers 46 and 47, respectively. Each of these packers is an annular member and is of compound formation since each comprises both a relatively rigid annulus, or a backing ring 48, 49, respectively, and a relatively resilient deformable annulus 51, 52, respectively. In each case the nondeformable annulus, 48, 49, is preferably composed of suitable metal, preferably brass, whereas the deformable annulus 51, 52, is composed of suitable resilient material such as rubber or, in those cases where the liquid to be confined is a solvent of or has other deleterious effects upon rubber, the deformable annuli are composed of synthetic rubber such as that known to the trade as "neoprene."

The outer packers 46, i. e., the one which is more distant from the bores 16 and 17, is constructed in such a manner as to present one of its lateral faces 53 toward the innermost packer 47; hence this face is identified as the working face of the outer packer 46. Consequently, this face 53 is cupped, i. e., concave with the result that the corners 54 at the intersection of this cupped face 53 with the inner and outer circumferential faces 56 and 57, respectively, of the annular packer, are relatively thin and therefore more flexible than would be the case were the packers made perfectly square or rectangular in cross section. Accordingly, these thin edges 54 are more sensitive to increase in pressure in the fluid confined by the packer and are pressed outward into sealing engagement more readily with the inner and outer circumferential walls 58 and 59 respectively, of the packing recess, by the hydrostatic pressure. Preferably the backing ring 48 is of angular form in cross-section, being composed of a flat annular body portion 61 with a cylindrical flange 62 extending laterally therefrom. These two angularly extending portions 61 and 62 of the backing ring embrace that corner of the packing ring 51 which otherwise would come in contact with the portion 37 of the interstice 29, and the backing ring therefore operates to prevent trusion of the deformable annulus 51 into this interstice when hydrostatic pressure is imposed thereupon as explained more fully in our said Patent No. 2,269,431.

In the case of the innermost packer 47, its nondeformable annulus, or backing ring 49 is preferably imbedded within the deformable portion 52 of the packing ring. That is to say, deformable material 52 is disposed upon both faces of the nondeformable ring 49. Accordingly, we prefer that the nondeformable ring 49 be in the form of a flat ring having a plurality of perforations 66 therein through which the deformable material 52 can extend to join those portions of the deformable material 52 which lie upon the opposite faces of the nondeformable ring 49. In actual practice this packer probably will be constructed by vulcanizing the deformable material after the nondeformable ring 49 has been embedded therein with the result that both lateral portion of the deformable material, as well as those portions thereof which extend through the perforations 56, will be of integral construction.

The inner face 71 of the packer 47, i. e., that face thereof which is directed inwards toward the fluid to be confined also is preferably concave, or cupped similarly to the face 53 of the outer packer, with the result that this packer also is more sensitive to increase in hydrostatic pressure in that its lateral edges are pressed more tightly into sealing engagement with the circumferential walls 58 and 59 of the packing recess 39 when the hydrostatic pressure increases.

It will be observed that the circumferential walls 58 and 59 of the packing recess are uninterruptedly smooth throughout their entire length, i. e., they are devoid of shoulders, recesses, or other deviation from straight line construction which would offer mechanical support to the packers and prevent their shifting laterally within the recess. Instead, the packers are kept separated by the hydrostatic pressure of fluid 52 which is confined within the recess 38 between the two packers. Consequently, this fluid 62 serves as the abutment against which the inner packer 47 is pressed when hydrostatic pressure develops against its inner face 71, and which prevents the inner packer from moving laterally within the recess 38 toward the outer packer 46 as the result of such pressure. It is apparent therefore, that the inner packer 52 should be constructed so as to seal the recess 38 against leakage of liquid or fluid in either direction past the packer 47; and for this reason we find it advantageous to construct the outer face 73 also of the inner packer 47 in cupped formation so as to enhance the efficiency of the packer in preventing leakage of fluid past the packer toward the bores 16 and 17 of the pipe sections.

A suitable fitting 76, preferably of conventional design, is provided upon the side of the belled end 14 of the female pipe section 12 and communicates with the recess 48 between the two packers, so that this fitting 76 can be employed to permit the injection of the fluid 72 between the packers after the joint has been assembled. We also find it advantageous to form the interior of the belled end 14 of the female pipe section 12 with an annular shoulder 77 extending laterally into the recess 38 in position to engage the inner packer 37 in such a manner as to prevent its being thrust too far toward the inner end of the recess 38 when the fluid 72 is injected.

The modification illustrated in Fig. 3 is similar to that already described in all respects except that the recess 81 between the male and female joint sections 11' and 12' respectively, is considerably extended in a lateral direction, i. e., in a direction parallel to the axis of the pipe joint. The purpose of such extension of the recess 81 is to permit it to accommodate a plurality of the double acting packing rings 82 instead of the single double acting ring 47 of the previously described modification. Each of these several double acting packing rings 82 is supported by the fluid confined between it and the next adjacent ring, with the result that each ring 82 preferably is formed with its outer face 83 cupped and therefore more highly sensitive to fluid pressure as well as its inner face 84. Since the outermost packing ring 86 is supported by the shoulder 87 which defines the outer end of the recess 81 we prefer to form this ring 86 with its inner face 88 only of cupped formation.

Similar principles of construction and operation apply to the modification illustrated in Fig. 4, but as a precautionary measure we position a ring 91 of nondeformable material between each two adjacent deformable packers 92 so as to provide positive means for maintaining separation of the packing ring 92 in the event of failure of the fluid between the rings to operate in this capacity.

We claim:

A swivel pipe coupling comprising a pair of intercommunicating pipe elements mechanically interconnected for rotary movement with respect to each other and having an annular recess therebetween, a plurality of annular packers spaced apart within said recess, and fluid between each two adjacent packers, said packers establishing fluid-tight seal with both circumferential walls of said recess whereby said fluid operates to restrain said packers from lateral movement within said recess, at least one of said packers being immobilized against axial movement by equilibrated fluid pressures on opposite sides thereof.

FRANK M. ALLEN.
CLYDE B. TAYLOR.

REFERENCES CITED

The following references are of record in the file of this patent:

UNITED STATES PATENTS

| Number | Name | Date |
| --- | --- | --- |
| 991,501 | Graves | May 9, 1911 |
| 1,908,844 | Holtson | May 16, 1933 |
| 1,973,323 | Adams | Sept. 11, 1934 |
| 2,132,723 | Crickmer et al. | Oct. 11, 1938 |
| 2,165,052 | Hering | July 4, 1939 |
| 2,269,431 | Allen et al. | Jan. 13, 1942 |